United States Patent Office 3,459,764
Patented Aug. 5, 1969

3,459,764
PREPARATION OF NITROIMIDAZOLE
CARBAMATES
Janos Kollonitsch, Westfield, N.J., assignor to Merck &
Co., Inc., Rahway, N.J., a corporation of New Jersey
No Drawing. Filed Oct. 27, 1966, Ser. No. 589,826
Int. Cl. C07d 49/36; A01n 9/22. A61k 25/00
U.S. Cl. 260—309
9 Claims

ABSTRACT OF THE DISCLOSURE

Nitroimidazole carbamates are prepared by transesterification of hydroxylalkyl or hydroxylalkylidene nitroimidazoles with carbamic acid esters in the presence of certain organo tin compounds. The carbamates have activity against the protozoal parasitic diseases trichomoniasis and enterohepatitis.

This invention is concerned with an improved process for preparing imidazole carbamates. More particularly, it is concerned with a method of converting hydroxyalkyl or hydroxyalkylidene imidazoles to the corresponding imidazole carbamates by transesterification with an ester of carbamic acid or an N-alkyl substituted carbamic acid.

The 1-methyl-5-nitroimidazole-2-ylalkyl or alkylidene carbamates of the formula:

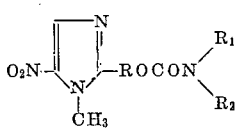

wherein:

R represents a lower alkylene group or a lower alkylidene group;
$R_1$ and $R_2$ are hydrogen or methyl;

are valuable compounds having activity against the causitive organisms of the protozoal parasitic diseases trichomoniasis and enterohepatitis, the latter being a disease occurring primarily in turkeys which is caused by the protozoan parasite Histomonas meleagridis.

It is an object of this invention to provide an improved method for preparing imidazole carbamates. Another object is to provide an improved method for preparing the above-mentioned imidazole carbamates. Other objects will be apparent from the detailed description of this invention hereinafter provided.

In accordance with this invention, it has been found that 2-hydroxyalkyl or 2-hydroxyalkylidene imidazoles can be converted to the corresponding carbamates by reaction with carbamate esters or N-alkyl carbamate esters in the presence of a catalytic amount of an organo tin compound. In particular, I have found that this process is especially useful in preparing the above-described 5-nitroimidazole carbamates in accordance with the following reaction:

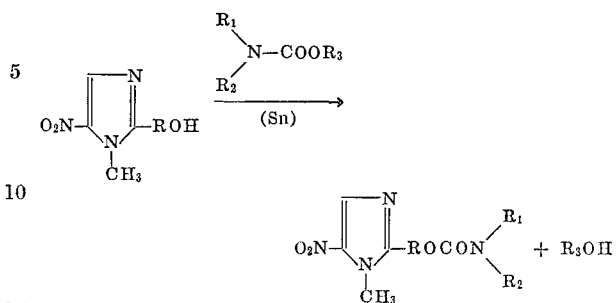

wherein:

R, $R_1$ and $R_2$ are the same as above; and
$R_3$ is lower alkyl.

In accordance with my invention, I have found that this reaction can be effected in excellent yields when it is carried out in the presence of catalytic quantities of certain organic tin compounds.

Catalysts suitable for use in this process are the dilower alkyl tin oxides and the dilower alkyl tin dilower acylates, the alkyl being $C_{1-8}$ alkyl radicals including, for example, methyl, ethyl, propyl, butyl, pentyl, hexyl, heptyl, octyl, and branched chain isomers thereof, and the acyl radicals being the corresponding radicals of the alkanoic acids containing fewer than nine carbon atoms. Suitable organo tin compounds useful as catalysts for the process of this invention that might be mentioned are dibutyl tin oxide, dioctyl tin oxide, dimethyl tin oxide, dilower alkyl tin diacetates such as dibutyl tin diacetate, and the like. The amount of catalyst used in carrying out this reaction will vary, depending upon the particular catalyst being used. In general, the amount of catalyst present should be between about 0.1% and 8% based on the weight of the imidazole compound being reacted.

In carrying out the improved process of this invention, the imidazole compound and the catalyst are mixed with an excess of the carbamic acid ester, the carbamate serving thereby both as a reaction medium and reactant. The mixture is then heated to a temperature of between about 130–170° C. for sufficient time to complete the transesterification. If desired, additional catalyst can be added during this period of heating. After completion of the transesterification reaction, the imidazole carbamate can be readily recovered from the resulting reaction mixture by cooling it to below about 100° C. and adding thereto an equal amount of water, which causes precipitation of the product in solid form. The product can then be recovered by filtration.

The following examples illustrate methods of carrying out the improved process of this invention:

EXAMPLE 1

A stirred mixture of 3.14 g. (0.02 mole) of 1-methyl-2-hydroxymethyl-5-nitroimidazole, 8.9 g. of ethyl carbamate, and 0.015 g. of dibutyl tin oxide are slowly heated (over a period of about 12 minutes) to a temperature of 160–165° C. on an oil bath, then maintained at that temperature for a period of about 30 minutes. The ethanol formed by transesterification is distilled out through a short Vigreux column. To facilitate ethanol removal, a small stream of nitrogen is passed over the reaction mixture. After about 15 minutes of the heating period, an additional 0.015 g. of catalyst (dibutyl tin oxide) is added. After completion of the heating period, the mixture is air-cooled to 100° C., at which point it is still liquid; thereafter, 25 ml. of water are added. The product immediately separates out and begins to crystallize. The slurry is placed in an ice bath, stirred for about 30 minutes, then filtered, and the product washed with water and (for quicker drying) diethyl ether, followed by drying in vacuo at about 50° C. Approximately 3.3 g. of light tan 1-methyl-5-nitroimidazole -2-ylmethyl carbamate melting at 164–166.5° C. is obtained.

When the process of this example is carried out using dioctyl tin oxide, dimethyl tin oxide, or dibutyl tin diacetate as the catalyst in place of the dibutyl tin oxide, good yields of 1-methyl-5-nitroimidazole-2-ylmethyl carbamate are obtained.

EXAMPLE 2

A mixture of 3.24 g. of 1-methyl-2-(1'-hydroxyethyl)-5-nitroimidazole, 9.2 g. of ethyl carbamate, and 0.018 g. of dibutyl tin oxide are slowly heated to a temperature of 160–165° C. and maintained at that temperature for about 30 minutes. During the heating period, a small stream of nitrogen is passed over the heated mixture to facilitate the removal of the ethanol formed during the reaction. After completion of the reaction, the mixture is cooled to 100° C. and 25 ml. of water are added. The precipitated 1 - (1' - methyl-5'-nitroimidazole-2'-yl)-ethyl carbamate is allowed to crystallize in an ice bath. The precipitated product is recovered by filtration, washed with water, and dried under diminished pressure at about 50° C.

When the foregoing process is carried out using ethyl N-methyl carbamate or ethyl N,N-dimethyl carbamate in place of ethyl carbamate, the corresponding N-substituted carbamates are obtained.

EXAMPLE 3

A reaction vessel equipped with a nitrogen inlet tube, a mechanical stirrer, a distillation head, and a cooled receiver is charged with 75 g. of methyl carbamate and heated. The carbamate forms a clear melt at about 56° C. and 31.4 g. of 1-methyl-2-hydroxymethyl-5-nitroimidazole and 0.6 g. of dibutyl tin oxide are added. The reaction mixture is heated under a stream of nitrogen to a temperature of 142–143° C. and maintained at this temperature for about one-half hour. At this point, an additional 0.6 g. of catalyst is added and the reaction mixture maintained at 142–143° C. for an additional half hour, during which time about 10 ml. of distillate is collected. The mixture is allowed to cool to about 90–100° C. and is then quenched by adding 100 ml. of water. The product, 1-methyl-5-nitroimidazole-2-yl carbamate, soon precipitates and the mixture is cooled further with stirring in an ice bath for about one hour. The product is filtered, washed with 2×25 ml. of cold water, and dried in vacuo to yield 36.4 g. of a light tan solid melting at 156–162° C.

The 1-methyl-2-hydroxymethyl-5-nitroimidazole used as the starting material in Examples 1 and 3 can be prepared as follows:

83.0 grams (0.864 mole) of 2-hydroxymethyl imidazole is dissolved in 200 ml. of acetic anhydride. The solution is allowed to stand overnight at room temperature. The acetate salt of 2-acetoxymethyl imidazole crystallizes. The crystalline solid is slurried well with ether, filtered, and the crystals are washed with ether until the odor of acetic acid is no longer detectable.

176.6 grams (0.882 mole) of 2-acetoxymethyl imidazole acetic acid salt is added in small amounts to 165 ml. of cold, fuming 90% nitric acid. This solution is added slowly with stirring and cooling to 150 ml. of cold, fuming 90% nitric acid containing 90.1 g. of gaseous $BF_3$. The reaction mixture is heated on the steam cone for 5 hours.

After cooling to room temperature, the reaction mixture is poured over ice and neutralized with sodium hydroxide. The resulting solution is then extracted with ethyl acetate and the ethyl acetate extracts evaporated in vacuo to dryness. The residue is refluxed for 1 hour in a solution of 100 ml. of 2.5 N sodium hydroxide and 100 ml. of methanol. The solution is then neutralized with hydrochloric acid and extracted with ethyl acetate. The extracts are evaporated to dryness, dissolved in methanol, and chromatographed over charcoal.

Elution of the charcoal with 50% ether-acetone first removes a small amount of imidazole-2-carboxaldehyde. The next substance eluted is 2-hydroxymethyl-4(5)-nitroimidazole. After recrystallization from acetone, this melts at 156–158° C.

12.6 grams of dimethyl sulfate is added to 11.1 g. of 2 - hydroxymethyl - 4(5) - nitroimidazole and the mass thoroughly mixed. The mass is then heated on the steam cone for 2 hours and cooled to room temperature.

A small amount of ice is added and the remaining dimethyl sulfate and methyl hydrogen sulfate neutralized by slow addition of concentrated ammonium hydroxide. The resulting solution is extracted with chloroform. The chloroform extracts are separated and evaporated to dryness to yield a residue consisting of 1-methyl-2-hydroxymethyl-5-nitroimidazole. Recrystallization from acetone affords substantially pure 1-methyl-2-hydroxymethyl-5-nitroimidazole, M.P. 117–119° C.

The 1-methyl-2-(1'-hydroxyethyl)-5-nitroimidazole used as the starting material in Example 2 can be prepared as follows:

A solution of methyl magnesium iodide is prepared from 4.5 g. of magnesium, 26.3 g. of methyl iodide and 90 ml. of diethyl ether. 2.8 mg. of this solution is diluted with 15 ml. of ether and added to a solution of 0.5 g. of 1-methyl-2-formyl-5-nitroimidazole in 20 ml. of diethyl ether. The mixture is refluxed for 20 minutes. An additional 15 ml. of diethyl ether is then added followed by 6.7 ml. of 0.5 N hydrochloric acid. The organic phase is separated, dried over sodium sulfate, and evaporated to dryness in vacuo to give 0.27 g. of 1-methyl-2-(1'-hydroxyethyl)-5-nitroimidazole. This material is dissolved in ether, an equal volume of petroleum ether added, and the resulting solution evaporated to give crystalline 1-methyl-2-(1'-hydroxyethyl)-5-nitroimidazole.

The acidic aqueous layer is extracted with an equal volume of methylene chloride. The methylene chloride solution is evaporated to a residue which is dissolved in a minimum volume of methylene chloride. One-half volume of petroleum ether is added and the solution evaporated to give a residue of 1-methyl-2-(1'-hydroxyethyl)-5-nitroimidazole.

The solid products obtained are combined and dissolved in eithyl acetate. The solution is filtered through acid-washed alumina and the filtrate evaporated to a small volume. 1 - methyl - 2-(1'-hydroxyethyl)-5-nitroimidazole crystallizes; M.P. 144–145° C. It is recrystallized from ethyl acetate to give pure 1-methyl-2-(1'-hydroxyethyl)-5-nitroimidazole; M.P. 145–147° C.

I claim:

1. The process of preparing an imidazole compound of the formula:

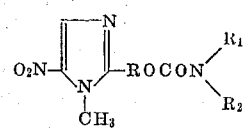

wherein: R is lower alkylene or lower alkylidene; and $R_1$ and $R_2$ are hydrogen or methyl; which comprises mixing an imidazole of the formula:

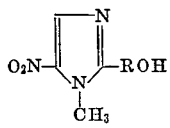

wherein: R is the same as above; and from about 0.1% to about 8%, based on the weight of the imidazole, of a dilower alkyl tin oxide or a dilower alkyl tin diacetate with an excess of a carbamate ester of the formula:

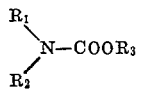

wherein: $R_1$ and $R_2$ are the same as above; and $R_2$ is lower alkyl; at a temperature of 130–170° C.

2. The process of claim 1 wherein the imidazole is 1-methyl-2-hydroxymethyl-5-nitroimidazole.

3. The process of claim 1 wherein the imidazole is 1-methyl-2-(1'-hydroxyethyl)-5-nitroimidazole.

4. The process of claim 1 wherein the dilower alkyl tin oxide is dibutyl tin oxide.

5. The process of claim 1 wherein the carbamate ester is ethyl carbamate.

6. The process of claim 1 wherein the carbamate ester is methyl carbamate.

7. The process of claim 4 wherein the imidazole is 1-methyl-2-hydroxymethyl-5-nitroimidazole and the carbamate ester is ethyl carbamate.

8. The process of claim 4 wherein the imidazole is 1-methyl-2-(1'-hydroxyethyl)-5-nitroimidazole and the carbamate ester is ethyl carbamate.

9. The process of claim 4 wherein the imidazole is 1-methyl-2-hydroxymethyl-5-nitroimidazole and the carbamate ester is methyl carbamate.

References Cited

UNITED STATES PATENTS 2,689,866  9/1954  Spielman et al.

OTHER REFERENCES

Adams et al.: Chem. Rev., vol. 65, pp. 569–71 relied on (October 1965).

Kraft: Jour. Amer. Chem. Soc., vol. 70, pp. 3569–71 (1948).

HENRY R. JILES, Primary Examiner

N. TROUSOF, Assistant Examiner

U.S. Cl. X.R.

260—642, 999